Figure 1:
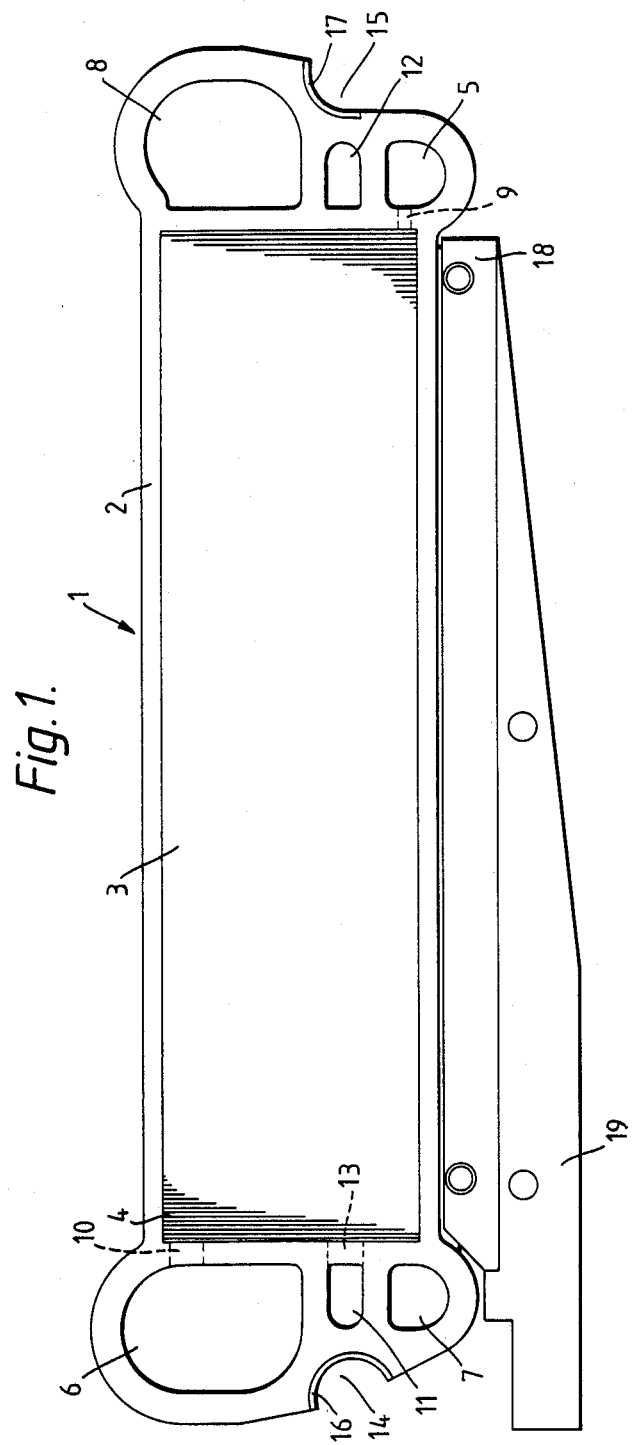

United States Patent [19]
Burgess

[11] Patent Number: 4,824,542
[45] Date of Patent: Apr. 25, 1989

[54] FILTER PRESS STRUCTURE OR CELL AND METHOD OF ASSEMBLING SAME

[75] Inventor: Paul E. A. Burgess, Crowton, England

[73] Assignee: Imperial Chemical Industries PLC, London, England

[21] Appl. No.: 112,891

[22] Filed: Oct. 27, 1987

[30] Foreign Application Priority Data
Oct. 30, 1986 [GB] United Kingdom ............... 8626010

[51] Int. Cl.⁴ .................... C25B 9/00; B01D 25/00
[52] U.S. Cl. ................................ 204/253; 204/286; 210/230; 210/236
[58] Field of Search ............................ 210/230, 236; 204/253-258, 286

[56] References Cited
U.S. PATENT DOCUMENTS

| | | | |
|---|---|---|---|
| 1,273,357 | 7/1918 | Gougnard | 204/256 |
| 2,252,916 | 8/1941 | Crosby | 210/230 X |
| 2,590,242 | 3/1952 | Fusco | 210/230 X |
| 4,032,423 | 6/1977 | Cunningham | 204/256 X |
| 4,153,532 | 5/1979 | Fitch et al. | 204/253 X |
| 4,367,134 | 1/1983 | Kircher | 210/230 X |
| 4,541,911 | 9/1985 | Burgess et al. | 204/253 |

FOREIGN PATENT DOCUMENTS

| | | |
|---|---|---|
| 38445 | 10/1981 | European Pat. Off. . |
| 58238 | 8/1982 | European Pat. Off. . |
| 132079 | 6/1987 | European Pat. Off. . |
| 1269808 | 11/1986 | U.S.S.R. . |
| 1503799 | 3/1978 | United Kingdom . |
| 0132079 | 1/1985 | United Kingdom . |

Primary Examiner—Donald R. Valentine
Attorney, Agent, or Firm—Cushman, Darby & Cushman

[57] ABSTRACT

Filter press structure or cell and method of assembling the component parts, e.g. the component parts of an electrolytic cell, on a support structure of a pair of support rods, in which the component parts have pairs of jaws to be positioned on the support rods, and in which each pair of jaws is so shaped that one jaw may be positioned on a support rod only when the component part is at an angle to the plane between the support rods, the method comprising positioning a jaw on a support rod and rotating the component part to contact the other jaw with the other support rod. The method is simple to operate and results in the component parts of the structure being firmly fixed in position, yet it permits ready removal of a component part.

26 Claims, 7 Drawing Sheets

FILTER PRESS STRUCTURE OR CELL AND METHOD OF ASSEMBLING SAME

This invention relates to a method of assembling the component parts of a filter press type structure, and in particular to a method of assembling the component parts of an electrolytic cell of the filter press type.

Filter press type structures are known which comprise a plurality of plate-like components and, for example, a plurality of separators, e.g. a plurality of porous separators. Various processes may be effected in such structures, for example, a filtration or concentration process. In recent years filter press type structures for use as electrolytic cells have also been developed which comprise a large number of plate-like component parts, that is a large number of anodes, cathodes, and gaskets. Such electrolytic cells may comprise a large number of alternating anodes and cathodes, for example, fifty anodes alternating with fifty cathodes arranged in the form of a filter press type structure. Such electrolytic cells may comprise even more anodes and cathodes, for example up to one hundred and fifty alternating anodes and cathodes, and the cells may be monopolar or bipolar.

In recent years electrolytic cells of the filter press type have been developed for use in the production of chlorine and aqueous alkali metal hydroxide solution by the electrolysis of aqueous alkali metal chloride solution, particularly cells in which the separator is a substantially hydraulically impermeable cation-exchange membrane. Where aqueous alkali metal chloride solution is electrolysed in an electrolytic cell of the membrane type the solution is charged from a header to the anode compartments of the cell and chlorine produced in the electrolysis and depleted alkali metal chloride solution are discharged from the anode compartments to a header, alkali metal ions are transported across the membranes to the cathode compartments of the cell to which water or dilute alkali metal hydroxide solution is charged from a header, and hydrogen and alkali metal hydroxide solution produced by the reaction of alkali metal ions with water are discharged from the cathode compartments of the cell to a header.

The assembly of such filter press type structures, and in particular the assembly of electrolytic cells of the filter press type, presents some difficulties. For example, although such electrolytic cells are generally used with the cell horizontally disposed, that is with the component parts of the cell positioned vertically, assembly of the electrolytic cell in such a horizontally disposed position presents some difficulties. It is difficult to position the component parts of the cell accurately with respect to each other when these component parts are assembled in a vertical manner, and in particular it is difficult to position the separators accurately in relation to the anodes, cathodes and gaskets.

An obvious way to overcome this difficulty is to assemble the cell in a vertical mode, that is to position the component parts of the electrolytic cell horizontally and thus to build up a vertical stack, and when the cell has been assembled to turn the stack through 90° C. so that the cell is positioned horizontally, that is with the component parts of the cell positioned vertically.

Such a method of assembly of an electrolytic cell of the filter press type has been the subject of published patent applications. For example, in published European Patent Application No. 0 038 445 there is described a method of assembling a monopolar filter press type electrolytic cell, which method comprises (a) assembling a vertical stack of horizontal electrode frames with a horizontal membrane sheet between each pair of opposed frames,
(b) preconditioning the vertical stack by passing moist, warm fluid through the stack,
(c) applying pressure to opposite vertical ends of the stack so as to vertically compress the vertical stack,
(d) rotating the compressed vertical stack from a vertical orientation to a horizontal orientation.

In published European Patent Application No. 0 058 328 there is described a method of assembling a monopolar filter press type electrolytic cell having a plurality of generally planar electrodes appropriately mounted to electrode frames with ion-selective permeable membrane sheets interposed between each adjacent pair of electrodes, which comprises the steps of:

(a) placing a first end frame on a generally horizontal supporting structure,
(b) treating the membrane sheets with a hydrolysing fluid,
(c) placing a first cathode frame on to the first end frame, the first cathode frame being oriented generally horizontally,
(d) placing a first membrane sheet onto the generally horizontally oriented cathode frame, the first membrane sheet being oriented generally horizontally thereacross,
(e) placing a first anode frame onto the first membrane sheet, the first anode frame being oriented generally horizontally,
(f) placing a second membrane sheet onto the first anode frame, the second membrane sheet being oriented generally horizontally thereacross,
(g) placing a second cathode frame onto the second membrane sheet, the second cathode frame being oriented generally horizontally thereon,
(h) repeating steps d-g a predetermined number of times until the desired number of anode and cathode frames are stacked in a generally vertical stack atop the generally horizontal supporting structure,
(i) placing a second end frame atop the generally vertical stack of frames,
(j) vertically compressing the generally vertical stack of frames into a compressed state,
(k) securing retainers to the generally vertical stack of frames to retain the generally vertical stack of frames in the compressed state, and
(l) rotating the generally vertical compressed stack of generally horizontal frames and members to an operating position wherein the frames and membranes are oriented generally vertically.

Assembly of the component parts of a filter press type electrolytic cell in a vertical stack presents some undesirable features. Thus failure to position the electrodes frames in a precisely horizontal position may lead to distortion of the electrode frames, particularly when the stack is compressed. Also, where the electrolytic cell is a monopolar cell the heavy copper members associated with each anode and cathode and through which the anodes and cathodes are attached to bus-bars may cause the anode frames and cathode frames to sag and to deviate from a horizontal position. The membrane sheets positioned between adjacent anodes and cathodes are subjected to the mass of the anodes and cathodes in the vertical stack above the membrane sheet, and there is a substantial risk of distortion or even of irreparable damage to the membrane sheets ocurring, particularly to those in the lower part of the stack. Turning of the vertical stack through 90° to a horizontal position may also cause damage to the electrolytic cell.

Methods of assembling the component parts of an electrolytic cell are known in which the component parts are positioned vertically during assembly. For example, the component parts may have suitably shaped apertures and the component parts may be positioned on horizontally disposed support rods which pass through the apertures. Thus, in published European Patent Application No. 0 132 079 there is described a method of assembling an electrolytic cell of the filter press type comprising a plurality of anodes, cathodes, gaskets of an electrically insulating material, and separators, in which method the electrolytic cell is assembled on a jig comprising a support unit having removably affixed thereto a plurality of substantially horizontally disposed support rods positioned to at least one side of the support unit, the method comprising positioning anodes, cathodes and gaskets on the horizontally disposed support rods with a separator positioned between an adjacent anode and cathode, removing the support unit, and compressing the thus formed assembly of anodes, cathodes, gaskets and separators on the horizontally disposed support rods to form the electrolytic cell.

Although such a method of assembly results in an electrolytic cell in which the component parts of the cell are held firmly in position by the support rods, which pass through apertures in the component parts and which are thus not susceptible of displacement during use of the cell, it does suffer from the disadvantage that because the support rods pass through apertures in the component parts of the electrolytic cell it is impossible to remove one particular component part from the stack of parts, for example, a component part which has been damaged during operation of the electrolytic cell, without first removing a number of other component parts or without first removing the support rods. Removal of the support rods means that the component parts can then readily be displaced in position with respect to each other, albeit inadvertently. Furthermore, assembly of the component parts of the electrolytic cell by positioning the component parts on support rods which pass through apertures in the component parts is tedious and time consuming.

Another method of assembly of the component parts of an electrolytic cell of the the filter press type is described in GB Patent No. 1 503 799 in which the component parts of the cell have arms at the sides thereof and the arms are placed on support rods of a support structure. In an electrolytic cell assembled in such a way a particular component part may be removed from the cell merely by lifting the part off the support rods. However, an electrolytic cell assembled in this way suffers from a disadvantage in that there is no restraint to the displacement, that is the upward displacement, of the componenet parts relative to each other during assembly of the cell, e.g. when the stack of component parts is compressed during assembly, nor to displacement of component parts during use of the cell.

The present invention relates to a method of assembling the component parts of a filter press type structure, particularly the component parts of an electrolytic cell of the filter press type, in which the component parts are readily placed in the desired position with respect to each other during assembly of the structure and in which the component parts are not readily displaced in position with respect to each other during use of the structure, yet in which a component part of the structure may readily be removed from the structure.

According to the present invention there is provided a method of assembling the component parts of a filter press type structure onto a support structure which comprises a pair of support rods, at least some of the component parts having a pair of jaws adapted to be positioned onto the support rods, and in the method the filter press type structure being assembled by positioning the jaws of the component parts onto the support rods, in which one of the jaws of a pair thereof associated with a component part is so shaped that is may be positioned onto a support rod only when the component part is at an angle to the plane between the support rods, the method comprising positioning the said jaw of the said component part onto one of the support rods and thereafter rotating the component part about the said support rod and positioning the other jaw of the said component part onto the other support rod.

Although not limited thereto the method of the invention is particularly suitable for assembling the component parts of an electrolytic cell of the filter press type, and in a further embodiment of the invention there is provided a method of assembling the component parts of a filter press type electrolytic cell onto a support structure which comprises a pair of parallel supports rods, at least some of the component parts having a pair of jaws adapted to be positioned onto the support rods, and in t he method the cell being assembled by positioning the jaws of the component parts onto the support rods, in which one of the jaws of a pair thereof associated with a component part is so shaped that it may be positioned onto a support rod only when the component part is at an angle to the plane between the support rods, the method comprising positioning the said jaw of the said component part onto one of the support rods and thereafter rotating the component part about the said support rod and positioning the other jaw of the said component part onto the other support rod.

The invention will be described hereafter by reference to the assembly of the component parts of an electrolytic cell of the filter press type.

The support structure on which the component parts of the electrolytic cell are assembled comprises a pair of support rods, which support rods will generally be positioned substantially horizontally and which will generally be substantially parallel to each other. The support rods may be positioned between and be supported by a pair of support plates. It is preferred that the support rods lie in a plane which is substantially horizontal, and it is also preferred that the support rods are of circular cross-section as this is of assistance in the assembly of the component parts of the cell, particularly as one of the jaws of a component part is rotated about one of the support rods. The support rods may be metallic and thus electrically conducting or they may be non-metallic and electrically non-conducting, or the surfaces of the support rods may be coated with a layer of an electrically non-conducting material. Whether or not the support rods of the support structure are electrically conducting may be critical. What must clearly be avoided is to assemble the component parts of the electrolytic cell in such a way that there is direct contact between a metallic electrode and a metallic electrically conducting support rod of the support structure.

By component parts of a filter press type electrolytic cell there is meant the anodes, cathodes and gaskets or frame members of electrically insulating material. The electrolytic cell may be a monopolar cell which comprises separate anodes and cathodes or it may be a bipolar cell containing composite electrodes one face of which functions as an anode and another face of which functions as a cathode.

Not all of the component parts of the electrolytic cell need to be equipped with a pair of jaws adapted to be positioned onto the support rods of the support structure, and the structure of the electrolytic cell determines whether or not a particular component part needs to be equipped with a pair of jaws. For example, in a first type of electrolytic cell the electrodes, which may be anodes or cathodes or bipolar electrodes and which will, unless the context demands otherwise, be referred to hereafter as electrodes, may be positioned in a recess in frame-like gasket in which case the frame-like gaskets only need to be equipped with a pair of jaws. Alternatively, in a second type of electrolytic cell the gaskets, which may be of frame-like construction and have a central space which provides an anode or cathode compartment, may be positioned between each anode and adjacent cathode, for example between each monopolar anode and adjacent monopolar cathode or between each anode of a bipolar electrode and an adjacent cathode of a bipolar electrode. In this case the gaskets and also the electrodes may be equipped with a pair of jaws, but in a preferred embodiment of this type of electrolytic cell at least one of the gaskets positioned on either side of an electrode projects beyond the edge of the electrode at least in the region of the jaws thereon so that during assembly of the electrolytic cell the jaws of the gasket only come into contact with the support rods of the support structure. At least one of the gaskets of this embodiment may have a recess in the face thereof into which the electrode may be fitted, that part of the gasket which projects beyond the electrode in the region of the jaws contacting the support rods and providing the necessary electrical insulation between the support rods and the electrode.

The shape of the jaws on the component parts of the electrolytic cell is critical to the method of assembly of the present invention in one respect only, namely that the jaws must be so shaped that one of the jaws of a pair thereof associated with a component part may be positioned onto a support rod only when the component part is at an angle to the plane between the support rods, and so shaped that the component part may be rotated about the support rod to position the other jaw onto the other support rod. Given this functional requirement the skilled man will readily be able to design suitable shapes for the jaws associated with a component part of the electrolytic cell.

For example, and in particular where the support rods of the support structure are of circular crosssection, the jaws of the component part may also in cross section describe a segment of a circle which is not more than, and is preferably less than a semicircle. The openings in the jaws which describe a segment of a circle are so positioned on the component part that a first jaw of a pair on a component part may be positioned on a first support rod only when the component part is positioned at an angle to the plane between the support rods, whereas the other jaw of the pair may be positioned on the other support rod when the component part is rotated about the first support rod. After rotation it will clearly not be possible to remove the first jaw from the support rod merely by vertical movement of the component part as part of the first jaw will extend to a position under the support rod.

It is preferred that the pair of jaws associated with a component part of an electrolytic cell are positioned at or near opposite edges of the component part such that in the assembled electrolytic cell the component parts are positioned substantially between the support rods of the support structure.

It will be appreciated that as the component parts of the electrolytic cell are positioned onto the support rods of the support structure downward displacement of the component parts will be prevented by the support rods. Furthermore, as in a preferred embodiment the component parts are positioned substantially between the support rods sideways, or horizontal, displacement of the component parts will also be prevented by the support rods. A further and crucial benefit is also provided by the invention. As a component part of the electrolytic cell may be positioned on the support structure by positioning one of the jaws of the component part onto a first support rod only when the component part is at an angle to the plane between the support rods, and the other jaw of the component part may be brought into contact with the other support rod only by rotating the component part about the first support rod, vertical displacement of the component part when in position on the support rod is prevented as it is impossible to remove the jaws from contact with the support rods by vertical movement of the component part.

In a preferred embodiment the method of assembly of the present invention is effected by positioning the component parts of the electrolytic cell in an alternating sequence in which a jaw of a first component part is positioned onto a first support rod and then the other jaw of the first component part is positioned onto a second support rod, and thereafter a jaw of an adjacent component part is positioned onto the second support rod and the other jaw of the second component part is positioned onto the first support rod. The method of assembly may thus be effected by initially positioning a jaw of the component parts alternately onto a first support rod of the support structure and onto a second support rod of the support structure.

In another preferred embodiment of the invention an electrode is positioned between gaskets of an electrically insulating material, and in this case the component part may be considered to be the resultant "sandwich" of gasket-electrode-gasket. It is preferred the the component parts of gasket-electrode-gasket are positioned alternately on the support rods in the manner hereinbefore described.

The gaskets, and the electrodes, may have a plurality of spaced apart projections and recesses on and in the surfaces thereof which cooperate with each other and which serve to fix the gaskets in position in relation to the electrode.

The electrolytic cell may contain a separator positioned between each anode and adjacent cathode, that is between each separate anode and cathode or between each anode of a bipolar electrode and an adjacent cathode of a bipolar electrode thereby dividing the cell into a plurality of separate anode and cathode compartments. The separator may be a porous hydraulically permeable diaphragm or a substantially hydraulically impermeable ion-exchange membrane. During assembly of the electrolytic cell the separator may be attached to a gasket by any convenient means, for example, by means of an adhesive. In the assembled electrolytic cell the separator may be positioned between adjacent gaskets and held in position by the compressive force exerted in the final stages of assembly of the electrolytic cell.

Assembly of the electrolytic cell is completed by positioning end plates at either end of the stack of component parts of the electrolytic cell and compressing the stack by any convenient means. For example, the end plates may be positioned on tie rods and the stack may be compressed by compressing the stack between the end plates.

In the electrolytic cell the gaskets are made of an electrically insulating material. It is desirable that the gaskets are flexible, and preferably resilient, in order to aid in achieving leak-tight seals in the electrolytic cell.

The gaskets are suitably made of an organic polymeric material which material may be, for example, a polyolefin e.g. polyethylene or polypropylene; a hydrocarbon elastomer, e.g. an elastomer based on ethylene-propylene copolymer, an ethylene-propylene-diene copolymer, natural rubber or a styrene butadiene rubber; or a chlorinated hydrocarbon, e.g. polyvinyl chloride or polyvinylidene chloride. It is particularly desirable that the material of the gasket be chemically resistant to the liquors in the electrolytic cell, and when the cell is to be used in the electrolysis of aqueous alkali metal chloride solution the material of the gasket may be a fluorinated polymeric material, for example polytetrafluoroethylene, polyvinyl fluoride, polyvinylidene fluoride, fluorinated ethylene-propylene copolymer, or the gasket may comprise a substrate having an outer layer of such a fluorinated polymeric material, or the gasket may comprise an organic polymeric material containing such a fluorinated polymeric material as a filler.

Where the electrolytic cell contains a separator which is a porous diaphragm the nature of the diaphragm will depend on the nature of the electrolyte which is to be electrolysed in the cell. The diaphragm should be resistant to degradation by the electrolyte and by the products of electrolysis and, where an aqueous solution of alkali metal chloride is to be electrolysed, the diaphragm is suitably made of a fluorine-containing polymeric material as such materials are generally resistant to degradation by the chlorine and alkali metal hydroxide produced in the electrolysis. Preferably, the porous diaphragm is made of polytetrafluoro-ethylene, although other materials which may be used include, for example, tetrafluoroethylene - hexafluoropropylene copolymers, and fluorinated ethylene - propylene copolymers.

Suitable porous diaphragms are those described, for example, in UK Patent No. 1503915 in which there is described a porous diaphragm of polytetrafluoroethylene having a microstructure of nodes interconnected by fibrils, and in UK Patent No. 1081046 in which there is described a porous diaphragm produced by extracting a particulate filler from a sheet of polytetrafluoroethylene. Other suitable porous diaphragms are described in the art.

Where the separator to be used in the electrolytic cell is a cation-exchange membrane the nature of the membrane will also depend on the nature of the electrolyte which is to be electrolysed in the cell. The membrane should be resistant to degradation by the electrolyte and by the products of electrolysis and, where an aqueous solution of alkali metal chloride is to be electrolysed, the membrane is suitably made of a fluorine-containing polymeric material containing cation-exchange groups, for example, sulphonic acid, carboxylic acid or phosphonic acid groups, or derivatives thereof, or a mixture of two or more such groups.

Suitable cation-exchange membranes are those described for example, in UK Patent Nos. 1184321, 1402920, 14066673, 1455070, 1497748, 1497749, 1518387, and 1531068.

The electrode in the electrolytic cell will generally be made of a metal or alloy and the nature of the metal or alloy will depend on whether the electrode is to be used as an anode or cathode and on the nature of the electrolyte which is to be electrolysed in the electrolytic cell.

Where aqueous alkali metal chloride solution is to be electrolysed and the electrode is to be used as an anode the electrode is suitably made of a film-forming metal or an alloy thereof, for example of zirconium, iobium, tungsten or tantalum, but preferably of titanium, and the surface of the anode suitably caries a coating of an electro-conducting electrocatalytically-active material. The coating may comprise one or mote platinum group metals, that is platinum, rhodium, iridium, ruthenium, osmium or palladium, and/or an oxide of one or more of these metals. The coating of platinum group metal and/or oxide may be present in admixture with one or more non-noble metal oxides, for example titanium dioxide, e.g. in the form of a solid solution of the oxides.

Electro-conducting electrocatalytically-active material for use as anode coatings in an electrolytic cell for the electrolysis of aqueous alkali metal chloride solution, and the methods of application of such coatings, are well known in the art.

Where aqueous alkali metal chloride solution is to be electrolysed and the electrode is to be used as a cathode, the electrode is suitably made of iron or steel, or of other suitable metal, for example nickel. The cathode may be coated with a material designed to reduce the hydrogen overpotential of the electrolysis.

The electrode may at least in part have a foraminate surface, for example, it may be a perforated plate, or it may have a mesh surface or surfaces, e.g. a woven mesh, or it may comprise a plurality of spaced apart elongated members, e.g. a plurality of strips, which will generally be parallel to each other and vertically disposed in the electrolytic cell.

In the electrolytic cell the anode compartments will be provided with means for feeding electrolyte to the compartments, suitably from a common header, and with means for removing products of electrolysis from the compartments. Similarly, the cathode compartments of the cell will be provided with means for removing products of electrolysis from the compartments, and optionally with means for feeding water or other liquor to the compartments, suitably from a common header.

For example, where the cell is to be used in the electrolysis of aqueous alkali metal chloride the anode compartments of the cell will be provided with means for feeding the aqueous alkali metal chloride solution to the anode compartments of the cell and with means for removing chlorine and depleted aqueous alkali metal chloride solution from the anode compartments, and the cathode compartments of the cell will be provided with means for removing hydrogen and cell liquid containing alkali metal hydroxide from the cathode compartments, and optionally, and if necessary, with means for feeding water or dilute alkali metal hydroxide solution to the cathode compartments.

In the electrolytic cell the individual anode compartments of the cell will be provided with means for feeding electrolyte to the compartments, suitably from a common header, and with means for removing products of electrolysis from the compartments. Similarly the individual cathode compartments of the cell will be provided with means for removing products of electrolysis from the compartments, and optionally with means for feeding water or other liquor to the compartments, suitably from a common header.

Although it is possible for the means for feeding electrolyte and for removing products of electrolysis to be provided by separate pipes leading to or from each of the respective anode and cathode compartments in the cell such an arrangement may be unnecessarily complicated and cumbersome, particularly in an electrolytic cell of the filter press type which may comprise a large number of such compartments. In a preferred type of electrolytic cell the gaskets, and optionally the electrodes, have a plurality of openings therein which in the cell together define separate compartments lengthwise of the cell and through which the electrolyte may be fed to the cell, e.g. to the anode compartments of the cell, and the products of electrolysis may be removed from the cell, e.g. from the anode and cathode compartments of the cell. The compartments lengthwise of the cell may communicate with the anode compartments and cathode compartments of the cell via channels in the electrodes, e.g. in the faces of the electrodes, or via channels in the gaskets, e.g. in the faces of the gaskets or through the walls of the gaskets.

Where the electrolytic cell comprises hydraulically permeable diaphragms there may be two or three openings which define two or three compartments lengthwise of the cell from which electrolyte may be fed to the anode compartments of the cell and through which the products of electrolysis may be removed from anode and cathode compartments of the cell.

Where the electrolytic cell comprises cation-permselective membranes there may be four openings which define four compartments lengthwise of the cell from which electrolyte and water or other fluid may be fed respectively to the anode an cathode compartments of the cell and through which the products of electrolysis may be removed from the anode and cathode compartments of the cell.

Although the electrolytic cell which is assembled in the method of the invention may be used in the electrolysis of a wide variety of electrolytes it is particularly suitable for use in the electrolysis of aqueous alkali metal chloride solution to produce chlorine and akali metal hydroxide, particularly chlorine and sodium hydroxide. Where such a solution is electrolysed in an electrolytic cell of the diaphragm type the solution is fed to the anode compartments of the cell, chlorine which is produced in the electrolysis is removed from the anode compartments of the cell, the alkali metal chloride solution passes through the diaphragms and hydrogen and alkali metal hydroxide produced by electrolysis are removed from the cathode compartments, the alkali metal hydroxide being removed in the form of an aqueous solution of alkali metal chloride and alkali metal hydroxide.

Where an aqueous alkali metal chloride solution is electrolysed in an electrolytic cell of the membrane type containing a cation permselective membrane the solution is fed to the anode compartments of the cell and chlorine produced in the electrolysis and depleted alkali metal chloride solution are removed from the anode compartments, alkali metal ions are transported across the membranes to the cathode compartments of the cell to which water or dilute alkali metal hydroxide solution is charged and hydrogen and alkali metal hydroxide solution produced by the reaction of alkali metal ions with water are removed from the cathode compartments of the cell.

Figure 2:
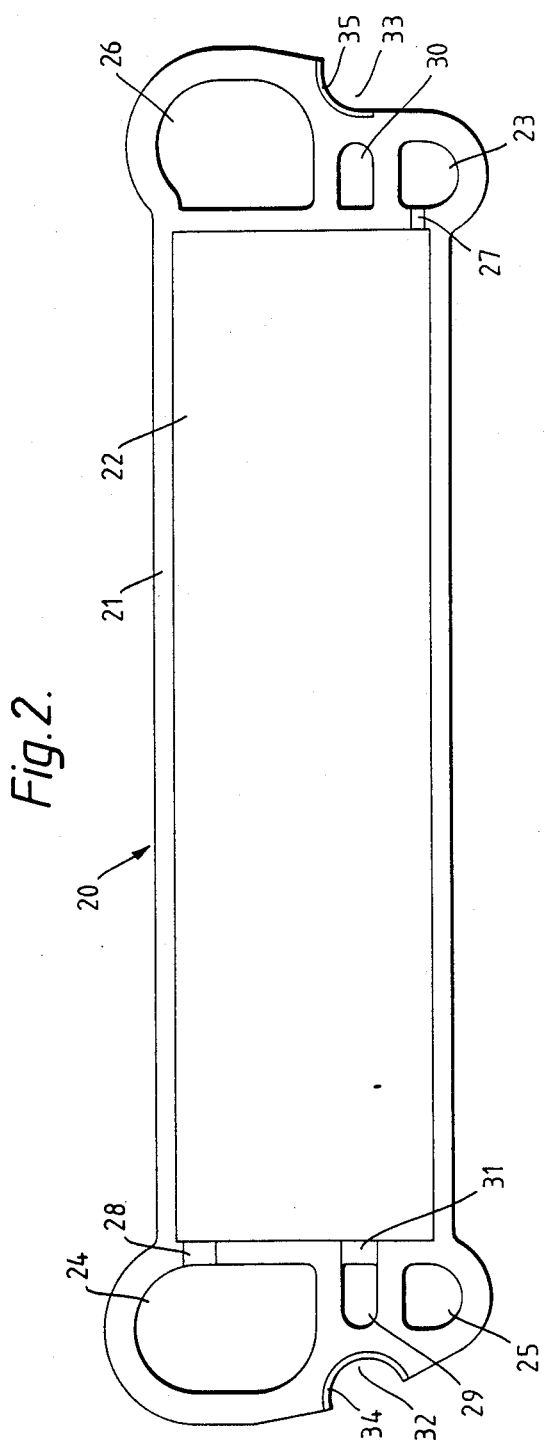
Figure 3:
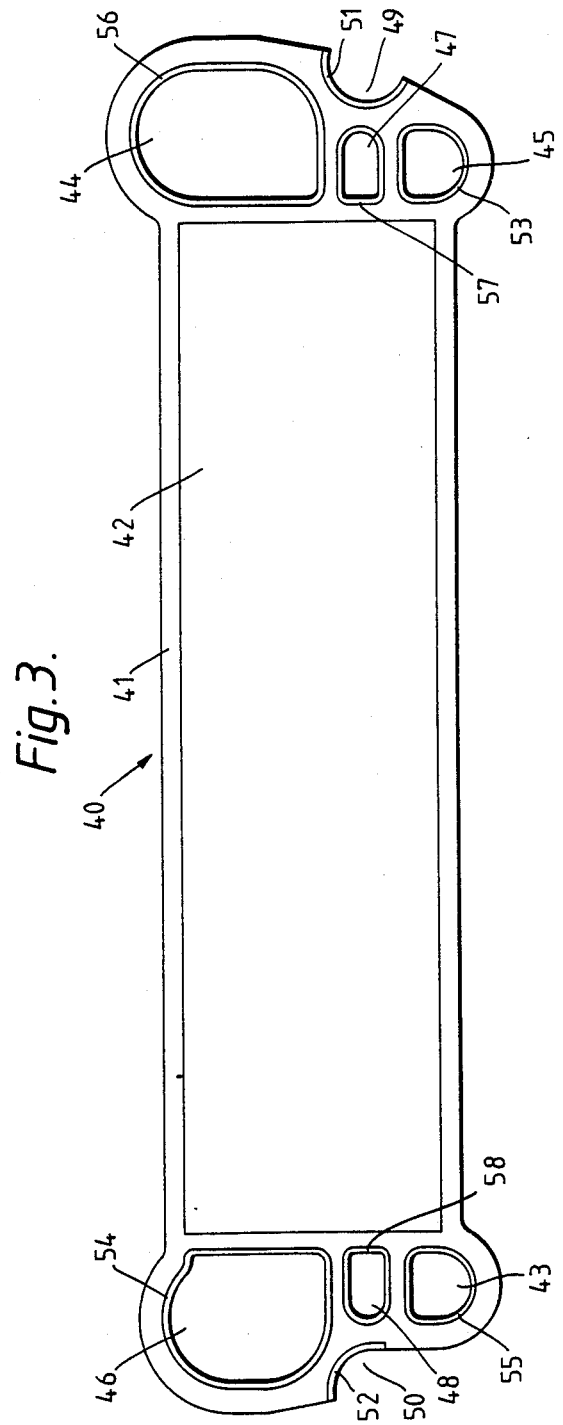
Figure 4:
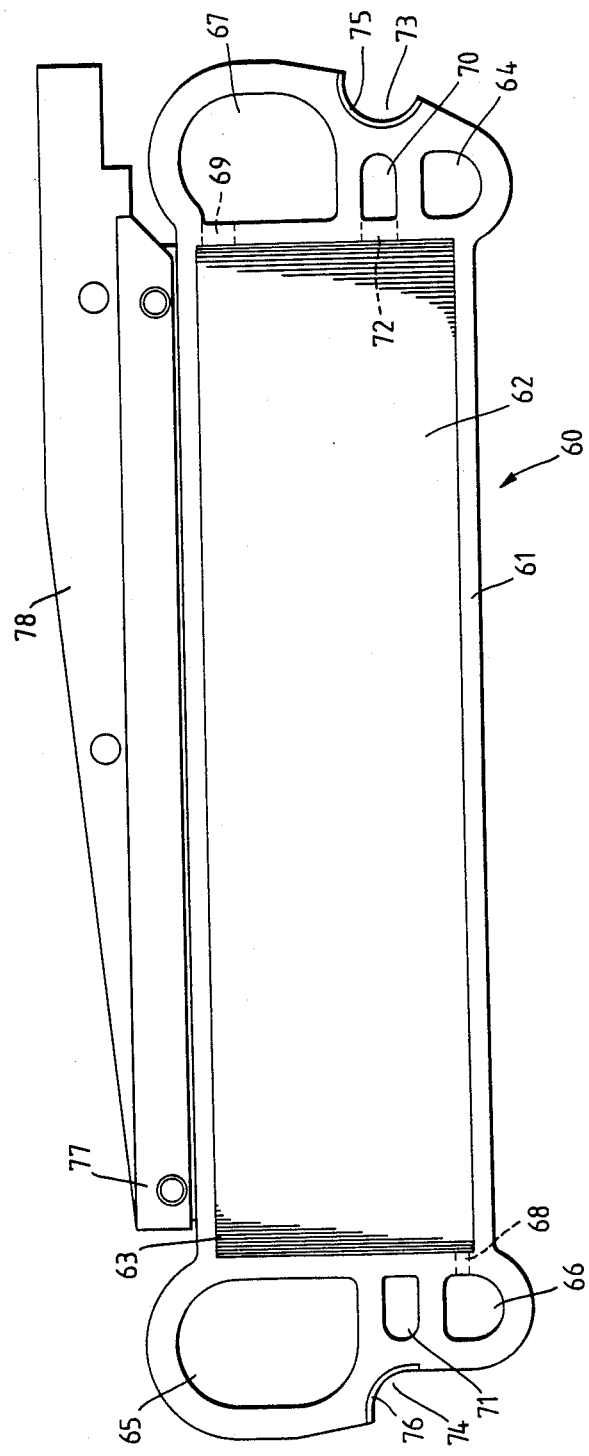
Figure 5:
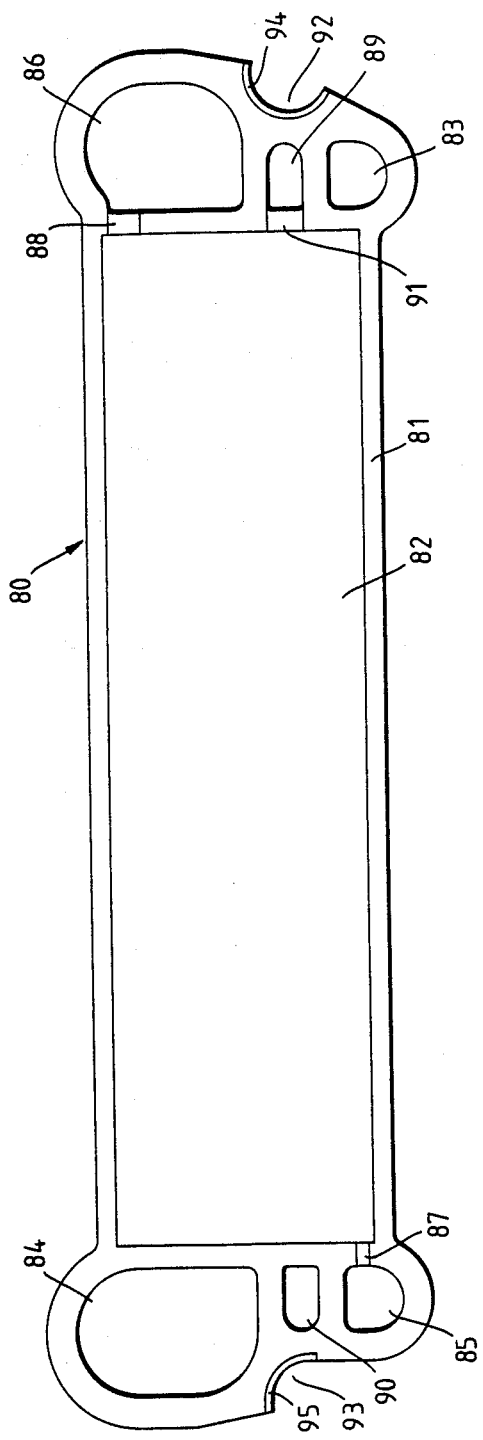
Figure 6:
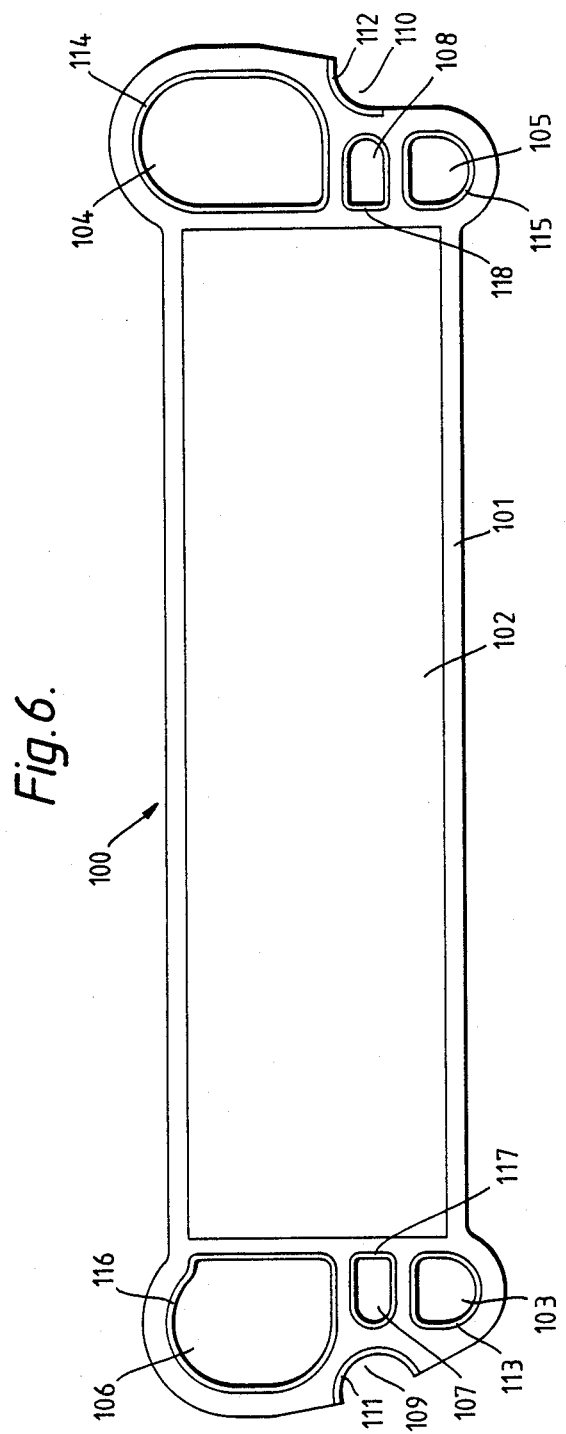
Figure 7:
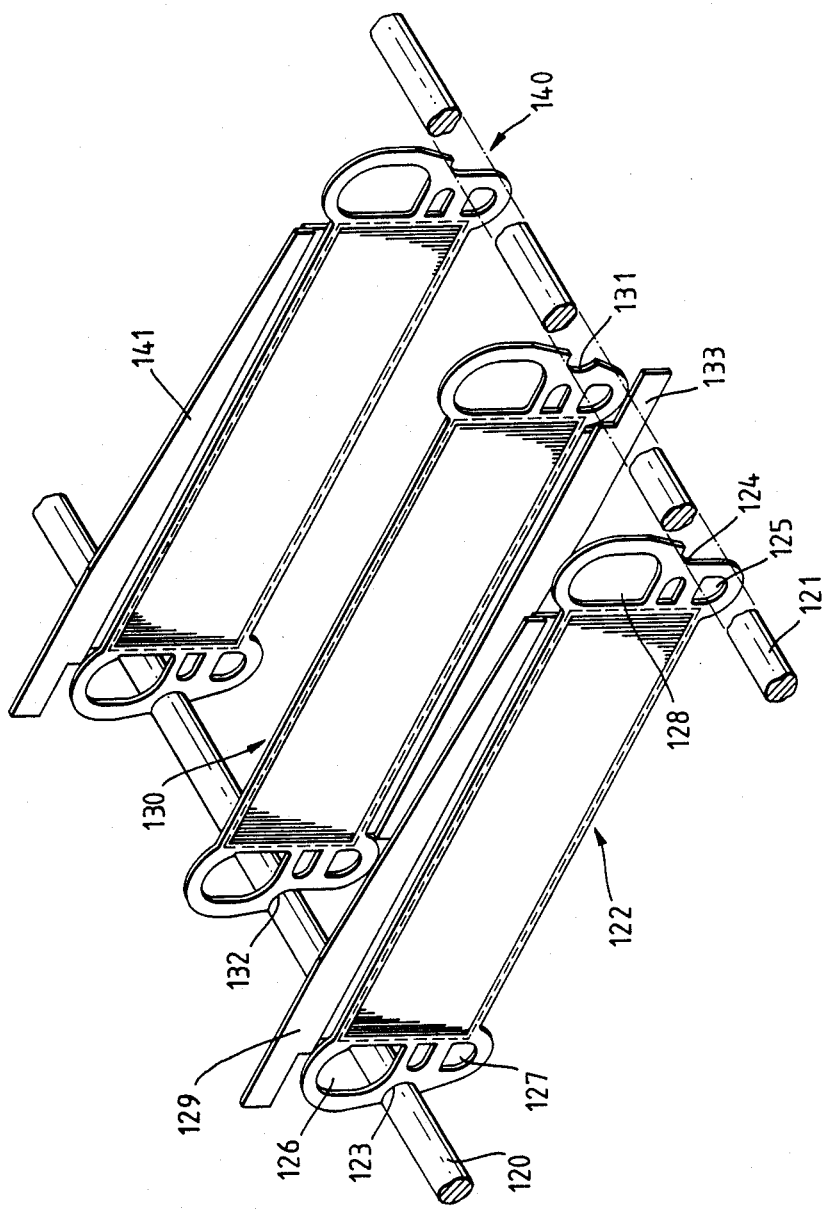

The invention is illustrated by the following embodiment in which FIG. 1 is a view in elevation of an anode for an electrolytic cell, FIG. 2 is a view in elevation of a first gasket for attachment to the anode of FIG. 1, FIG. 3 is a view in elevation of a second gasket for attachment to the anode of FIG. 1, FIG. 4 is a view in elevation of a cathode for an electrolytic cell, FIG. 5 is a view in elevation of a first gasket for attachment to the cathode of FIG. 4, FIG. 6 is a view in elevation of a second gasket for attachment for the cathode of FIG. 4, and FIG. 7 is an isometric exploded view of a part of cell which illustrates the method of assembly of the component parts of the electrolytic cell.

Referring to FIG. 1 the anode 1, which is made of titanium, comprises a frame-like section 2 defining a central opening 3 which is bridged by a plurality of spaced-apart strips 4 which are parallel to each other, which are displaced from and parallel to the plane of the frame-like section 2, and which are displaced to both sides of the plane of the frame-like section 2. The anode 1 comprises four openings 5, 6, 7 and 8 which, in the electrolytic cell, form a part of headers through which, respectively, electrolyte is charged to the anode compartments of the electrolytic cell, products of electrolysis are removed from the anode compartment of the cell, water or other liquor is charged to the cathode compartments of the cell, and products of electrolysis are removed from the cathode compartments of the cell. The central opening 3 is connected to the opening 5, and thus to the header through which electrolyte is charged to the anode compartments of the cell, via a port device 9 in the wall of the frame-like section 2, and the central opening 2 is connected to the opening 6, and thus to the header through which products of electrolysis are removed from the anode compartments of the cell, via a port device 10 in the wall of the frame-like section 2. The anode 1 comprises two further openings 11 and 12 which in the electrolytic cell form a part of balancing headers which are in communication with, respectively, the anode compatments and the cathode compartments of the cell. The opening 11, and thus the balancing header of which opening 11 forms a part, is connected via port device 13 in the wall of the frame-like section 2 to the central opening 3 and thus to the anode compartments of the cell. Anode 1 also comprises a jaw 14 positioned at one edge of the anode 1 and a jaw 15 positioned at an opposite edge of the anode 1. The jaws 14, 15 describe segments of a circle, the segment described by jaw 14 being greater than that described by jaw 15. Each of the jaws 14 and 15 is provided with a protective layer 16, 17 respectively of polytetrafluoroethylene which insulates the anode from the support rods of the support structure during use of the cell, and which aids movement of the anode on the support rods during the final stages of assembly of the cell. The anode 1 is completed by a projection 18 to which is bolted a copper member 19 through which in operation electrical power is fed to the anode 1.

Referring to FIG. 2 the gasket 20, which is made of an electrically insulating elastomeric material, comprises a frame-like section 21 defining a central opening 22 and four openings 23, 24, 25 26 which, in the electrolytic cell, form a part of headers through which, respectively, electrolyte is charged to the anode compartments of the electrolytic cell, products of electrolysis are removed from the anode compartments of the cell, water or other liquor is charged to the cathode compartments of the cell, and products of electrolysis are removed from the cathode compartments of the cell. The central opening 22 is connected to the opening 23, and thus to the header through which electrolyte is charged to the anode compartments of the cell, via a recess 27 in the wall of the frame-like section 21, and the central opening 22 is connected to the opening 24, and thus to the header through which products of electrolysis are removed from the anode compartments of the cell, via a recess 28 in the wall of the frame-like section 21. The gasket 20 comprises two further openings 29, 30 which in the electrolytic cell form a part of balancing headers which are in communication with, respectively, the anode compartments and the cathode compartments of the cell. The opening 29, and thus the balancing header of which opening 29 forms a part, is connected via recess 31 in the wall of the frame-like section 21 to the central opening 22 and thus to the anode compartments of the cell. The gasket 20 also comprises a jaw 32 positioned at one edge of the gasket 20 and a jaw 33 positioned at an opposite edge of the gasket 20. The jaws 32, 33 described segments of a circle, the segment described by jaw 32 being greater than that described by jaw 33. Each of the jaws 32 and 33 is provided with a protective layer 34, 35 respectively of polytetrafluoroethylene.

Referring to FIG. 3 the gasket 40, which is made of an electrically insulating elastomeric material, comprises a frame-like section 41 defining a central opening 42 and four openings 43, 44, 45, 46 which, in the electrolytic cell, form a part of headers through which, respectively, electrolyte is charged to the anode compartments of the electrolytic cell, products of electrolysis are removed from the anode compartments of the cell, water or other liquor is charged to the cathode compartments of the cell, and products of electrolysis are removed from the cathode compartments of the cell. The gasket 40 comprises two further openings 47, 48 which in the electrolytic cell form a part of balancing headers which are in communication with, respectively, the anode compartments and the cathode compartments of the cell. The gasket 40 also comprises a jaw 49 positioned at one edge of the gasket 40 and a jaw 50 positioned at an opposite edge of the gasket 40. The jaws 49, 50 describe segments of a circle, the segment described by jaw 49 being greater than that described by jaw 50. Each of the jaws 49, 50 is provided with a protective layer 51, 52 respectively of polytetrafluoroethylene. The gasket 40 is completed by upstanding lips 53, 54, 55, 56, 57, 58 positioned around the openings 45, 46, 43, 44, 47, 48 respectively, the height of these lips from the plane of the gasket 40 being slightly greater than the thickness of the anode 1.

The anode 1, gasket 20 and gasket 40 are assembled by positioning a face of anode 1 into contact with gasket 20 with port devices 9, 10 and 13 being positioned in recesses 27, 28 and 31 respectively of gasket 20. Gasket 40 is then positioned in contact with the other face of anode 1 with the upstanding lips 53, 54, 55, 56, 57, 58 being positioned in openings 7, 8, 5, 6, 11, 12 respectively with the lips being in contact with the face of the gasket 20 on the opposite side of the anode 1 thus providing a layer of an electrically insulating material around the openings 7, 8, 5, 6, 11, 12.

In order to locate and maintain the gaskets 20, 40 in position in relation to the anode 1 both the gaskets and the anode may comprise a plurality of projections and recesses on and in the faces there of which mate with each other. For simplicity these projections and recesses have not been shown.

Referring to FIG. 4 the cathode 60, which is made of nickel, comprises a frame-like section 61 defining a central opening 62 which is bridged by a plurality of spaced-apart strips 63 which are parallel to each other, which are displaced from and parallel to the plane of the frame-like section 61, and which are displaced to both sides of the plane of the frame-like section 61. The cathode 60 comprises four openings 64, 65, 66 and 67 which, in the electrolytic cell, form a part of headers through which, respectively, electrolyte is charged to the anode compartments of the electrolytic cell, products of electrolysis are removed from the anode compartments of the cell, water or other liquor is charged to the cathode compartments of the cell, and products of electrolysis are removed from the cathode compartments of the cell. The central opening 62 is connected to the opening 66, and thus to the header through which water or other liquor is charged to the cathode compartments of the cell, via a port device 68 in the wall of the frame-like section 61, and the central opening 62 is connected to the opening 67, and thus to the header through which products of electrolysis are discharged from the cathode compartments of the cell, via a port device 69 in the wall of the frame-like section 61. The cathode 60 comprises two further openings 70, 71 which in the electrolytic cell form a part of balancing headers which are in communication with, respectively, the cathode compartments and the anode compartments of the cell. The opening 70, and thus the balancing header of which opening 70 forms a part, is connected to the central opening 62 via port device 72 in the wall of the frame-like section 61, and thus to the cathode compartments of the cell. The cathode 60 also comprises a jaw 73 positioned at one edge of the cathode 60 and a jaw 74 positioned at an opposite edge of the cathode 60. The jaws 73, 74 describe segments of a circle, the segment described by jaw 73 being greater than that described by jaw 7. Each of the jaws 73, 74 is provided with a protective layer 75, 76 respectively of polytetrafluoroethylene which insulates the cathode from the support rods of the support structure during use of the cell, and which aids movement of the cathode on the support rods during final assembly of the cell. The cathode 60 is completed by a projection 77 to which is bolted a copper member 78 through which in operation electrical power is fed to the cathode 60.

Referring to FIG. 5 the gasket 80, which is made of an electrically insulating elastomeric material, comprises a frame-like section 81 defining a central opening 82 and four openings 83, 84, 85, 86 which, in the electrolytic cell, form a part of headers through which, respectively, electrolyte is charged to the anode compartments of the electrolytic cell, products of electrolysis are removed from the anode compartments of the cell, water or other liquor is charged to the cathode compartments of the cell, and products of electrolysis are removed from the cathode compartments of the cell. The central opening 82 is connected to the opening 85, and thus to the header through which liquor is charged to the cathode compartments of the cell, via a recess 87 in the wall of the frame-like section 81, and the central opening 82 is connected to the opening 86, and thus to the header through which products of electrolysis are removed from the cathode compartments of the cell, via a recess 88 in the wall of frame-like section 81. The gasket 80 comprises two further openings 89, 90 which in the electrolytic cell form a part of balancing headers which are in communication with, respectively, the cathode compartments and the anode compartments of the cell. The opening 89, and thus the balancing header of which opening 89 forms a part, is connected via recess 91 in the wall of frame-like section 81 to the central opening 82 and thus to the cathode compartments of the cell. The gasket 80 also comprises a jaw 92 positioned at one edge of the gasket 80 and a jaw 93 positioned at an opposite edge of the gasket 80. The jaws 92, 93 describe segments of a circle, the segment described by jaw 92 being greater than that described by jaw 93. Each of the jaws 92, 93 is provided with a protective layer 94, 95 respectively of polytetrafluoro-ethylene.

Referring to FIG. 6 the gasket 100, which is made of an electrically insulating elastomeric material, comprises a frame-like section 101 defining a central opening 102 and four openings 103, 104, 105, 106 which, in the electrolytic cell, form a part of headers through which, respectively electrolyte is charged to the anode compartments of the electrolytic cell, products of electrolysis are removed from the anode compartments of the cell, water or other liquor is charged to the cathode compartments of the cell, and products of electrolysis are removed from the cathode compartments of the cell. The gasket 100 comprises two further openings 107, 108 which in the electrolytic cell form a part of balancing headers which are in communication with, respectively, the cathode compartments and the anode compartments of the cell.

The gasket 100 also comprises a jaw 109 positioned at one edge of the gasket 100 and a jaw 110 positioned at an opposite edge of the gasket. The jaws 109, 110 describe segments of a circle, the segment described by jaw 109 being greater than that described by jaw 110. Each of the jaws 109, 110 is provided with a protective layer 111, 112 respectively of polytetrafluoro-ethylene. The gasket is completed by upstanding lips 113, 114, 115, 116, 117, 118 positioned around the openings 103, 104, 105, 106, 107, 108 respectively, the height of these lips from the plane of the gasket being slightly greater than the thickness of the cathode 60.

The cathode 60, gasket 80 and gasket 100 are assembled by positioning a face of cathode 60 into contact with gasket 80 with port devices 68, 69 and 72 being positioned in recesses 87, 88 and 91 respectively of gasket 80. Gasket 100 is then positioned in contact with the other face of cathode 60 with the upstanding lips 113, 114, 115, 116, 117, 118 being positioned in openings 64, 65, 66, 67, 70, 71 respectively with the lips being in contact with the face of the gasket 80 on the opposite side of the anode 1 thus providing a layer of an electrically insulating material around the openings 64, 65, 66, 67, 70, 71.

In order to locate and maintain the gaskets 80, 100 in position in relation to the cathode 60 both the gaskets and the cathode may comprise a plurality of projections and recesses on and in the faces thereof which mate with each other. For simplicity these projections and recesses are not shown.

Assembly of the electrolytic cell will now be described with reference to FIG. 7.

The component parts of the electrolytic cell are assembled on a support structure which comprises two parallel and horizontally disposed support rods 120, 121 positioned on supporting end plats (not shown). A cathode component 122, which comprises a cathode and a pair of gaskets positioned on either side of the cathode, as described with reference to FIGS. 4 to 6, is positioned on the support structure by positioning jaw 124 on rod 120 with cathode component inclined at an angle to the horizontal plane between the support rods 120, 121 and pivotting cathode component 122 about rod 120 until jaw 124 of cathode component 122 is positioned on rod 121. When cathode component 122 is in position on the rods 120, 121 the lower part of jaw 123 extends to a position under rod 120 thereby preventing vertical removal of cathode component 122 from contact with support rods 120, 121.

An anode component 130, which comprises an anode and a pair of gaskets positioned on either side of the anode, as described with reference to FIGS. 1 to 3, is positioned on the support structure by positioning jaw 131 on rod 121 with the anode component inclined at an angle to the horizontal plane between the support rods 120, 121 and pivotting anode component 130 about rod 121 until jaw 132 of anode component 130 is positioned on rod 120. when anode component 130 is in position on the rods 120, 121 the lower part of jaw 131 extends to a position under rod 121 thereby preventing vertical removal of anode component 130 from contact with support rods 120, 121.

A further cathode component 140 is positioned on the support rods 120, 121 in the same manner in which cathode component 122 was positioned on the support rods. A cation-exchange membrane in the form of a film is attached, for example by means of an adhesive, to the frame-like part of one of the gaskets of each of cathode components 122 and 140 and anode component 130 so that a cation-exchange membrane is positioned between each anode and adjacent cathode. The position of the cation-exchange membranes is indicated by the dotted lines on cathode components 122 and 140 and on anode component 130. Assembly of the electrolytic cell is completed by positioning the desired number of anode components and cathode components on the support rods 120, 121, positioning end plates (not shown) on the support rods, compressing the anode and cathode components between end plates, connecting the headers of which openings 125, 126, 127 and 128 in cathode component 122 form a part to, respectively, a source of electrolyte to be charged to the anode compartments of the cell, means for receiving the products of electrolysis from the anode compartments of the cell, a source of water or other liquor to be charged to the cathode compartments of the cell, and means for receiving the products of electrolysis from the cathode compartments of the cell, and connecting the copper members 129, 133, 141 to a source of electrical power.

In the electrolytic cell the anode compartments are formed by the space between cation-exchange membranes positioned on either side of an anode component, and the cathode compartments are formed by the space between cation-exchange membranes positioned on either side of a cathode component.

Operation of the electrolytic cell will be described with reference to the electrolysis of an aqueous sodium chloride solution. Aqueous sodium chloride solution is charged to the header of which opening 125 in cathode component 122 forms a part and thence into the anode compartments of the cell where it is electrolysed. Depleted sodium chloride solution and chlorine produced in the electrolysis pass from the anode compartments into the header of which the opening 126 in the cathode component 122 forms a part, and thence out of the cell.

Water is charged to the header of which the opening 127 in the cathode component 122 forms a part and thence into the cathode compartments of the cell. In the cathode compartments sodium ions transported across the cation-exchange membrane from the anode compartments react with hydroxyl ions formed by electrolysis of water, and sodium hydroxide solution and hydrogen which are formed pass from the cathode compartments through the header of which the opening 128 in the cathode component 122 forms a part, and thence out of the cell.

Distribution of liquors between each of the anode compartments, and between each of the cathode compartments, is assisted by the balancing headers referred to with reference to FIGS. 1 to 6 and which are in communication, respectively, with each of the anode compartments and with each of the cathode compartments.

I claim:

1. A method of assembling the component parts of a filter press type structure onto a support structure which comprises a pair of support rods, at least some of the component parts having a pair of jaws adapted to be positioned onto the support rods, and in the method the filter press type structure being assembled by positioning the jaws of the component parts onto the support rods, in which one of the jaws of a pair thereof associated with a component part is so shaped so that it may be positioned onto a support rod only when the component part is at an angle to the plane between the support rods, the method comprising positioning the said jaw of the said component part onto one of the support rods and thereafter rotating the component part about the said support rod and positioning the other jaw of the said component part onto the other support rod, and in the method the component parts of the filter press structure being positioned onto the support structure in an alternating sequence by positioning a jaw of a first component part onto a first support rod and then positioning the other jaw of the first component part onto the second support rod, and thereafter positioning a jaw of an adjacent component part onto the second support rod and then positioning the other jaw of the second component part onto the first support rod.

2. A method of assembling the component parts of a filter press type of electrolytic cell onto a support structure which comprises a pair of support rods, at least some of the component parts having a pair of jaws adapted to be positioned onto the support rods, and in the method the cell being assembled by positioning the jaws of the component parts onto the support rods, in which one of the jaws of a pair thereof associated with a component part is so shaped so that it may be positioned onto a support rod only when the component part is at an angle to the plane between the support rods, the method comprising positioning the said jaw of the said component part onto one of the support rods and thereafter rotating the component part about the said support rod and positioning the other jaw of the said component part onto the other support rod, and in the method the component parts of the filter press structure being positioned onto the support structure in an alternating sequence by positioning a jaw of a first component part onto a first support rod and then positioning the other jaw of the first component part into the second support rod, and thereafter positioning a jaw of an adjacent component part onto a second support rod and then positioning the other jaw of the second component part onto the first support rod.

3. A method as claimed in claim 1 or claim 2 in which the support rods of the support structure are positioned in a plane which is substantially horizontal.

4. A method as claimed in any one of claims 1 to 3 in which the support rods of the support structure are substantially parallel to each other.

5. A method as claimed in any one of claims 1 to 4 in which the support rods of the support structure are of circular cross-section.

6. A method as claimed in any one of claims 2 to 5 in which the component parts of the electrolytic cell comprise anodes. cathodes, and gaskets.

7. A method as claimed in claim 6 in which each of the anodes, cathodes and gaskets comprises a pair of jaws.

8. A method as claimed in any one of claims 1 to 7 in which each of the jaws of a pair thereof describes, in cross-section, a segment of a circle which is not greater than a semi-circle.

9. A method as claimed in any one of claims 1 to 8 in which the pair of jaws on a component part are positioned at or near opposite edges of the component part.

10. A method as claimed in any one of claims 2 to 9 in which an electrode is positioned between gaskets of an electrically insulating material.

11. A method as claimed in claim 10 in which the gaskets and the electrodes have a plurality of spaced apart projections and recesses on and in the surfaces thereof which co-operate with each other and which serve to fix the gaskets in position in relation to the electrode.

12. A method as claimed in any one of claims 2 to 9, 10 and 11 in which a separator is positioned between each anode and adjacent cathode.

13. A method as claimed in any one of claims 1 to 9 and 10 to 12 in which end plates are positioned at either end of the stack of component parts and the component parts are compressed between the end plates 14. A filter press type structure which comprises a plurality of component parts and a pair of support rods at least some of the component parts having a pair of jaws which are positioned on the support rods, in which a first jaw of a pair thereof associated with a component part is so shaped that it may be positioned onto a support rod only when the component part is at an angle to the plane between the support rods it being necessary to rotate the component part about the support rod in order to position the second jaw of the said component part onto the other support rod, and in which the component parts of the filter press structure are positioned onto the support structure in an alternating sequence with a first jaw of a component first part on on a first support rod and a second jaw of a first compound part on a second support rod, and a first jaw of an adjacent component part on a second support rod and a second jaw of an adjacent component part on a first support rod.

15. A filter press electrolytic cell which comprises a plurality of component parts and a pair of support rods at least some of the component parts having a pair of jaws which are positioned on the support rods, in which a first jaw of a pair thereof associated with a component part is so shaped that it may be positioned onto a support rod only when the component part is at an angle to the plane between the support rods it being necessary to rotate the component part about the support rod in order to position the second jaw of the said component part onto the other support rod, and in which the component parts of the filter press structure are positioned onto the support structure in an alternating sequence with a first jaw of a first component part on a first support rod and a second jaw of a first component part on a second support rod, and a first jaw of an adjacent component part of a second support rod and a second jaw of an adjacent component part on a first support rod.

16. A filter press type structure or filter press electrolytic cell as claimed in claim 14 or claim 15 in which the support rods of the support structure are positioned in a plane which is substantially horizontal.

17. A filter press type structure or filter press electrolytic cell as claimed in any one of claims 14 to 16 in which the support rods of the support structure are substantially parallel to each other.

18. A filter press type structure or filter press electrolytic cell as claimed in any one of the claims 14 to 17 in which the support rods of the support structure are of circular cross-section.

19. A filter press type structure or filter press electrolytic cell as claimed in any one of the claims 15 to 18 in which the component parts of the electrolytic cell comprise anodes, cathodes, and gaskets.

20. A filter press type structure or filter press electrolytic cell as claimed in claim 18 in which each of the anodes, cahtodes, and gaskets comprises a pair of jaws.

21. A filter press type structure or filter press electrolytic cell as claimed in any one of claims 14 to 19 in which each of the jaws of a pair thereof describes, in cross-section, a segment of a circle which is not greater than a semi-circle.

22. A filter press type structure or filter press electrolytic cell as claimed in any one of the claims 14 to 21 in which the pair of jaws on a component part is positioned at or near oppsoite edges of the component part.

23. A filter press type structure or filter press electrolytic cell as claimed in any one of claims 15 to 22 in which an electrode is positioned between gaskets of an electrically insulating material.

24. A filter press type structure or filter press electrolytic cell as claimed in claim 23 in which the gaskets and the electrodes have a plurality of spaced apart projections and recesses on and in the surfaces thereof which cooperate with each other and which serve to fix the gaskets in position in relation to the electrode.

25. The filter press type structure or filter press electrolytic cell as claimed in any one of claims 14 to 24 in which a separator is positioned between each anode and adjacent cathode.

26. A filter press type structure or filter press electrolytic cell as claimed in any one of claims 14 to 25 in which end plates are positioned at either end of the stack of component parts and the component parts are compressed between the end plates.

* * * * *